(No Model.) 3 Sheets—Sheet 1.
L. DURAND.
MACHINE FOR KNEADING DOUGH.

No. 589,250. Patented Aug. 31, 1897.

WITNESSES:
H L Leverett
J. Green

INVENTOR
Louis Durand
BY Knigba Bros
ATTORNEYS (No Model.) 3 Sheets—Sheet 2.
L. DURAND.
MACHINE FOR KNEADING DOUGH.
No. 589,250. Patented Aug. 31, 1897.

WITNESSES:
J+L. Leverett
J. Green.

INVENTOR
Louis Durand
BY
Attorneys (No Model.) 3 Sheets—Sheet 3.

L. DURAND.
MACHINE FOR KNEADING DOUGH.

No. 589,250. Patented Aug. 31, 1897.

WITNESSES:
J. L. Leverett
J. Green.

INVENTOR
Louis Durand
BY
Knight Bros
ATTORNEYS

UNITED STATES PATENT OFFICE.

LOUIS DURAND, OF NEW YORK, N. Y., ASSIGNOR TO EMILIA DURAND, OF SCHRAALENBURG, NEW JERSEY.

MACHINE FOR KNEADING DOUGH.

SPECIFICATION forming part of Letters Patent No. 589,250, dated August 31, 1897.

Application filed August 17, 1895. Renewed May 7, 1897. Serial No. 635,604. (No model.)

*To all whom it may concern:*

Be it known that I, LOUIS DURAND, a citizen of the United States, residing at New York, in the county and State of New York, have invented certain new and useful Improvements in Machines for Kneading Dough, of which the following is a specification.

My present invention relates to improvements in that class of dough-kneading machines comprising, essentially, a dough-pan and kneaders or stirrers rotating upon separate axes; and my invention relates particularly to improvements which facilitate the dumping or removal of the dough from the pan.

I provide a dumping table or platform journaled in a suitable framework or between two standards, and upon this dumping-table I mount the rotary pan and the rotary kneaders or stirrers, the several operating parts being driven through suitable gearing from a single driving-shaft which is journaled concentrically with the axis of the dumping table. I provide suitable means for locking the table in working position and also means for dumping it for removing the dough when it is unlocked.

In order that my invention may be fully understood, I will first describe it with reference to the accompanying drawings, and afterward point out the novelty with more particularity in the annexed claims.

Figure 1:
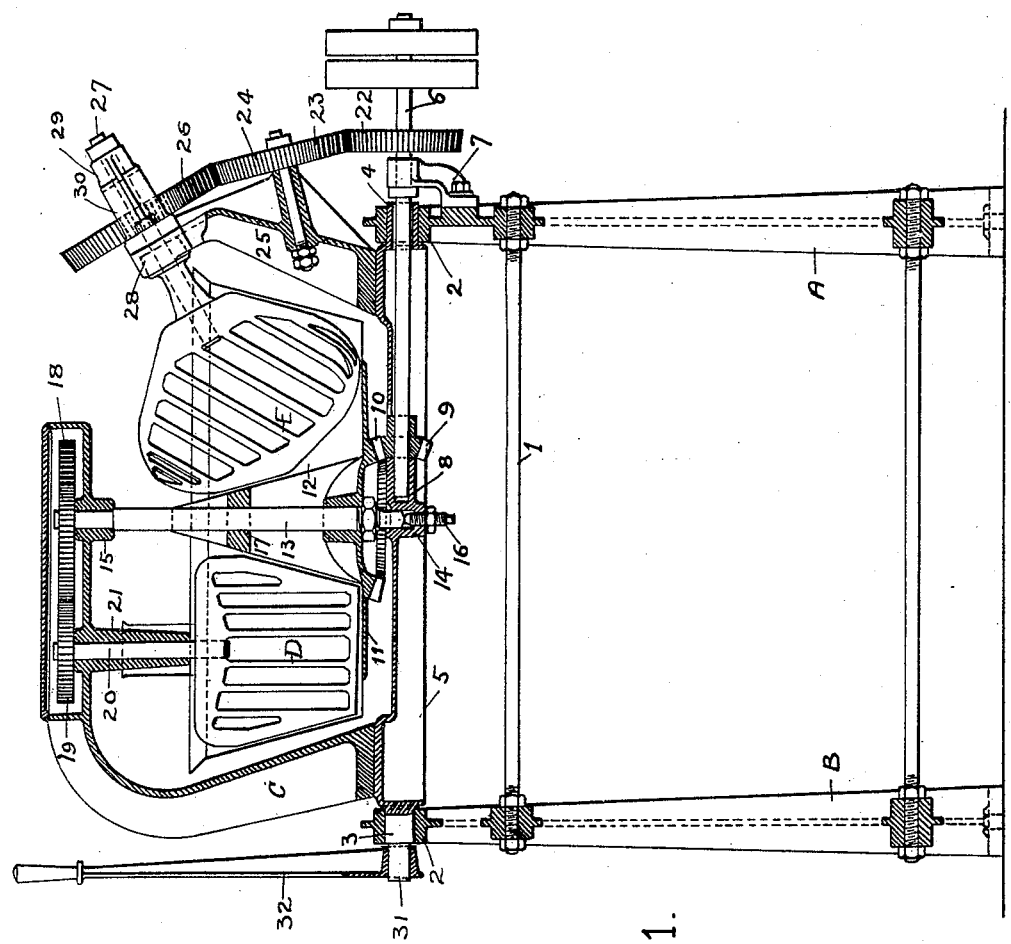
Figure 2:
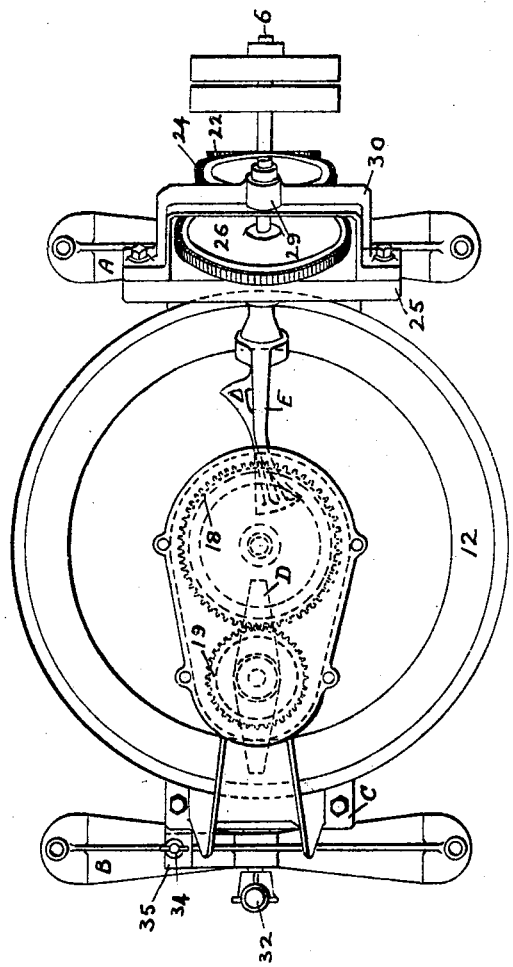
Figure 3:
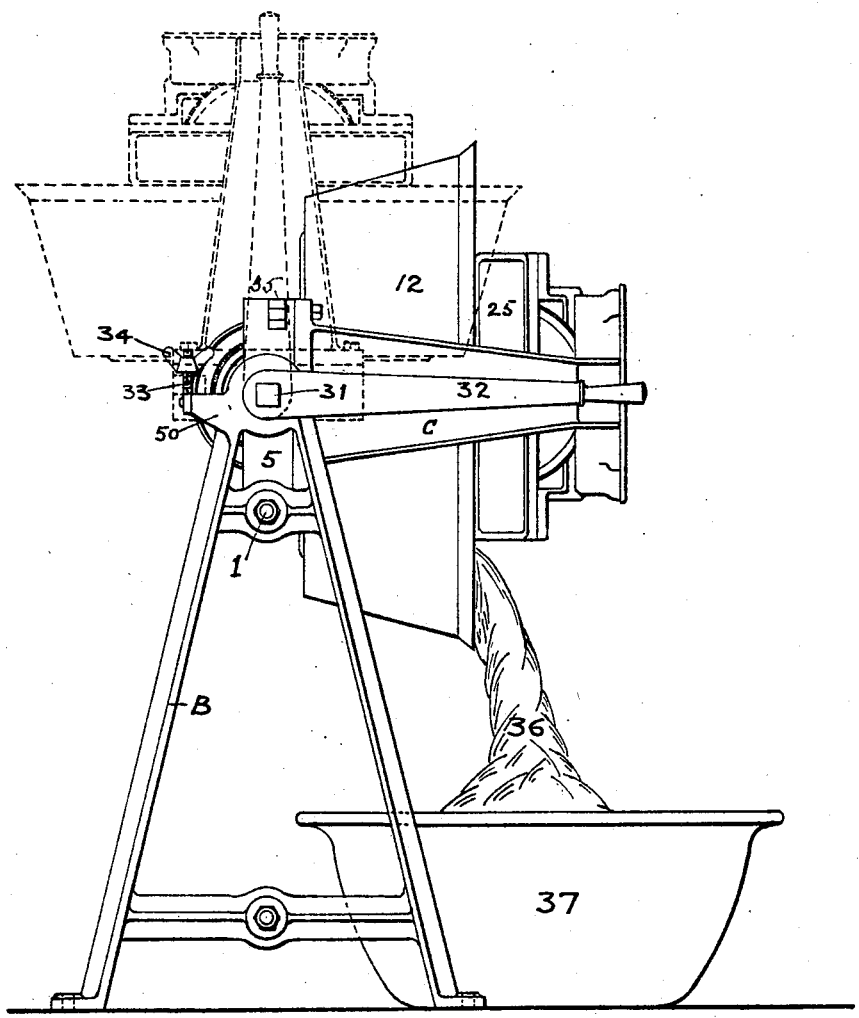

In said drawings, Figure 1 is a vertical sectional elevation of my improved machine, showing the parts in working position. Fig. 2 is a plan view of the same. Fig. 3 is an end elevation showing the machine in dumping position in full lines and the kneading position in dotted lines.

A and B are suitable standards, preferably braced together by means of the bolts 1 1. At the top of these standards are provided the journal-bearings 2 2, in which are journaled the trunnions 3 4 of the dumping table or platform 5, with which they are formed integral and upon which the working parts of the machine are mounted.

6 is the driving-shaft, extending in through the trunnion 4 and journaled in the outer bearing-bracket 7, secured to standard A, and the inner bearing 8, formed integral with the dumping-table 5. As the shaft 6 extends through the trunnion 4 and is journaled in the bearing 8, it will be observed that it will be supported on the same line with the dumping-table 5, which is necessary to facilitate simplicity in gearing the working parts of the machine on the dumping-table to said driving-shaft.

9 is a bevel-gear keyed to the shaft 6, adjacent to its inner bearing 8, and meshing with an integral annular bevel-gear 10, formed integral with the under frame 11 of the kneading-pan 12. Passing centrally through the under frame 11 and pan 12 is a shaft 13, which is journaled beneath in the step-bearing 14 and above in the bearing 15, formed in bracket C. The bracket C extends up from one side of the pivoted table 5 and over to a point centrally above the rotary pan 12. The under frame 11 and pan 12 are clamped securely to the shaft 13 in order that they will rotate together. The step-bearing 14 is provided with an adjustable bearing-screw 16 to regulate the position of the shaft 13.

17 is a ring or collar on shaft 13 for supporting the upper conical part of the pan 12 centrally on the shaft. Keyed to the upper end of the shaft 13 is a gear-wheel 18, which meshes with a similar gear 19, keyed to the upper end of the shaft 20, journaled in bearing 21 of the bracket C and supporting at its rear end the vertical stirrer D. The stirrer D is supported so as to rotate within the pan 12 in the customary manner. The bracket C is preferably enlarged above the bearings 15 and 21 and formed into a housing to inclose the gear-wheels 18 and 19.

22 is a bevel gear-wheel keyed to shaft 6 outside of bearing 7 and meshing with a similar gear 23, keyed to a short bearing-shaft 24, journaled in bracket 25, bolted to the dumping-table 5.

26 is another bevel gear-wheel meshing with the gear 24 and keyed to the inclined shaft 27, which rotates in the bearings 28 and 29 in the bracket 25 and supports at its inner end the inclined kneader or stirrer E. The bearing 29 is formed in the U-shaped strap or bracket 30, forming a part of or secured to the bracket 35. The trunnion 3 of the dumping-table 5 is extended beyond the bearing 2 and formed with a square shoulder or shank 31, upon which is mounted the operating hand-lever 32. The table 5 is provided with a slotted lug 35, which when the machine is in upright position is engaged by a pivoted bolt 33, provided with a nut 34. The bolt 33 is pivoted to a lug 50, extending out from the upper end of standard B. By the rotation of shaft 6 from the pulley on its outer end the pan 12 and stirrers D and E are rotated through the gearing already described until the dough is kneaded the proper amount. After the dough has been completely kneaded the nut 34 is loosened and the bolt 33 thrown back and the table carrying the operating parts dumped over on its trunnions 3 and 4 to dump the dough 36 into a receptacle, such as 37, as clearly shown in Fig. 3.

Having thus described my invention, what I claim, and desire to secure by Letters Patent, is—

1. In a dough-kneader, the combination of a suitable supporting frame or standards, a dumping frame or table journaled therein, the dough-pan rotatably mounted upon the table, kneaders or stirrers mounted also upon said dumping-table, and means for operating the stirrers and pan, substantially as set forth.

2. In a dough-kneader, the combination of a suitable supporting frame or standards, a dumping frame or table formed with trunnions journaled therein, a rotatable pan journaled upon said dumping-table, suitable stirrers or kneaders also journaled in said dumping-frame, a driving-shaft journaled concentrically to the journals of the dumping-frame, and suitable gearing between said shaft and the pan and stirrers, substantially as set forth.

3. In a dough-kneader, the combination of a suitable supporting frame or standards, the dumping frame or table formed with supporting-trunnions journaled therein, a driving-shaft journaled in said dumping frame or table and extending out through one of the trunnions, a vertical rotary shaft journaled in said dumping-frame, a rotary pan rigidly secured to said shaft, a bevel-gear on said pan, a bevel-gear on the operating-shaft meshing with the gear on the pan, suitable stirrers working in the pan, and means for operating them, substantially as set forth.

4. In a dough-kneader, the combination of a suitable supporting frame or standards, the dumping frame or table formed with supporting-trunnions journaled therein, a rotatable pan mounted upon a vertical shaft which is journaled in said dumping-frame, a driving-shaft geared to the pan and journaled concentrically with the trunnions, a vertical stirrer and an inclined stirrer journaled in suitable bearings supported upon the dumping-table, gearing between the pan-supporting shaft and one of the stirrers, and gearing between the driving-shaft and the other stirrer, substantially as set forth.

5. In a dough-kneader, the combination of a suitable supporting frame or standards, a dumping frame or table journaled therein, the dough-pan rotatably mounted upon the frame, kneaders or stirrers operatively mounted upon said dumping-table, inside of the pan, means for dumping the table carrying the pan, and means for locking the table in operative position, substantially as set forth.

6. In a dough-kneader, the combination of a suitable table or support, a vertical shaft journaled at its lower end in said table, a bracket extending up from said table and formed with a journal for upper end of said shaft, a pan mounted on the shaft, a suitable driving-shaft gearing directly with the pan, a vertical stirrer working in the pan and journaled in said bracket, gearing between said vertical stirrer and said shaft, an inclined stirrer also working in said pan and journaled in another bracket extending up from the table, and suitable gearing between the driving-shaft and said inclined stirrer, substantially as set forth.

LOUIS DURAND.

Witnesses:
HERBERT KNIGHT,
J. GREEN.